United States Patent [19]

Sutton

[11] Patent Number: 4,975,989
[45] Date of Patent: Dec. 11, 1990

[54] DISPOSAL OF WASTE MATERIAL

[76] Inventor: Gary Sutton, 32 Copt Elm Close, Charlton Kings, Cheltenham, Gloucestershire, England

[21] Appl. No.: 277,410

[22] Filed: Nov. 29, 1988

[30] Foreign Application Priority Data

Apr. 20, 1988 [GB] United Kingdom ............... 8809296

[51] Int. Cl.$^5$ .............................................. E03D 5/00
[52] U.S. Cl. ........................................ 4/300; 4/664; 119/161
[58] Field of Search .................. 4/662, 663, 664, 300; 119/1

[56] References Cited

U.S. PATENT DOCUMENTS

| 269,246 | 12/1882 | Waring, Jr. | 4/300 |
|---|---|---|---|
| 534,689 | 2/1895 | Hamilton | 4/424 |
| 3,171,135 | 3/1965 | Polichio | 4/300.1 |
| 3,931,649 | 1/1976 | Jankowski | 4/300.3 |
| 4,117,555 | 10/1978 | Dennis | 119/1 |
| 4,181,096 | 1/1980 | Grubman | 119/1 |
| 4,228,554 | 10/1980 | Tumminaro | 4/300 |
| 4,231,321 | 11/1980 | Cohen | 119/1 |
| 4,242,763 | 1/1981 | Walker | 4/300 |
| 4,720,880 | 1/1988 | Barreau | 4/300.3 |

FOREIGN PATENT DOCUMENTS

| 2741562 | 3/1979 | Fed. Rep. of Germany . |
| 2332383 | 6/1977 | France . |
| 1350552 | 4/1974 | United Kingdom . |
| 2041032 | 9/1980 | United Kingdom . |

Primary Examiner—Ernest G. Cusick
Assistant Examiner—Edward C. Donovan
Attorney, Agent, or Firm—Young & Thompson

[57] ABSTRACT

A disposal unit, for the disposal of dog waste, comprises a casing having an inlet slot in its upper wall, from which a chute leads downwardly within the casing to a bowl. An outlet conduit, incorporating a U-bend water trap, leads from the bowl out of the casing for connection to a sewage system. A flushing cistern is mounted within the casing and is operated by an external lever. In use, the dog waste is picked up in a scoop, placed in a disposable paper bag, and then deposited through the slot. It slides down into the bowl from where it may be flushed away by operation of the lever.

11 Claims, 1 Drawing Sheet

DISPOSAL OF WASTE MATERIAL

BACKGROUND OF THE INVENTION

The invention relates to the disposal of waste material, and particularly to the convenient disposal of dog excrement, hereinafter referred to as dog waste.

There is currently a widespread problem of dogs fouling public places with their waste, the main problem areas being public footpaths, parks and playing fields. The presence of such waste is unpleasant and unsightly, and can represent a significant health risk, particularly for children playing in areas which have been fouled by dogs.

In such areas it is normally left to employees of the local Council to clear up dog waste. Efforts have been made to educate the dog-owning public themselves to dispose of the waste left by their dogs, and scoops and similar devices are available to enable a dog owner to clear up the waste. However, such devices are not widely used, largely due to the problem of disposing of the waste after it has been cleared up. It is inconvenient for the dog owner to carry the waste home for disposal in a domestic lavatory, and where waste is deposited in rubbish bins, the unpleasant task of finally disposing of the waste is still left to Council employees whose job it is to empty the bins. While the waste is in the rubbish bins it can cause unpleasant smells, attract flies and generally be a hazard to health.

The present invention sets out to overcome these problems by providing a purpose-built disposal unit which may be installed in any public area to provide for the immediate and convenient disposal of dog waste and thereby encourage dog owners themselves to clear up and dispose of the waste left by their dogs.

SUMMARY OF THE INVENTION

According to the invention there is provided a disposal unit, for the disposal of dog waste, comprising a casing having an openable access door or panel, a receptacle for waste material within the casing, an outlet conduit leading from the receptacle and out of the casing for connection to a sewage system, a trap which, in use, is water-filled to prevent the passage of gases from the sewage system along the outlet conduit and into the receptacle, means for supplying water to the interior of the receptacle above the trap so as to flush waste material from the receptacle, and an elongate inlet conduit extending downwardly into communication with the receptacle from an inlet aperture accessible from outside the casing, whereby waste material introduced through said aperture falls under gravity down the inlet conduit and into the receptacle.

To use the disposal unit, the dog owner simply picks up the dog waste, perhaps using a scoop and/or paper bag, and deposits it in the inlet aperture in the upper part of the unit. The waste is then flushed away, through the trap, directly to the sewage system, which may comprise a main sewer or a septic tank.

The trap is preferably a U-bend in the outlet conduit which, in use, is filled with water. The receptacle preferably comprises an open-topped bowl, and the lower end of the inlet conduit faces into the open top of the bowl.

The means for supplying water above the trap may include a cistern assembly, or it may comprise a valve-controlled conduit for connection to the mains water supply and opening into the upper part of the receptacle. In either case the means for supplying water to the interior of the receptacle is preferably operable by means of a control member which is accessible externally of the casing.

The unit may include a water supply conduit within the casing, having a tap whereby water may be withdrawn from the conduit to clean the interior of the casing. Preferably an overflow conduit, provided with a water-filled trap, is connected between the upper part of the receptacle and said outlet conduit.

The openable access door or panel is preferably controlled by a key-operated lock.

The casing of the unit may have an upper wall, preferably sloping, in which said inlet aperture is formed, the upper end of the inlet conduit being secured to the upper wall of the casing in register with said aperture.

The invention also provides a bag, for use in the disposal of dog waste, which bag is generally rectangular, is formed of water-absorbent paper, and has an integral paper tab projecting therefrom to form a handle. The bag may be formed from a generally rectangular sheet of water-absorbent paper two opposite side edges of which have been brought together, overlapped and glued together to form a flattened tube, and the edge portions of a third side of the sheet have been glued together to form the bottom of the bag, at least part of said overlapping edges providing said integral paper tab projecting from the bag to form a handle.

An extreme outer portion of one of said opposite side edges of the sheet may remain unglued to the portion of the opposite side edge which it overlaps, so as to provide said tab. The edge portions of said third side of the bag are preferably folded over along their length before being glued to the part of the bag over which they are folded. The tab is preferably disposed on a major face of the bag.

There may be provided, with each bag, a generally rectangular cover element, also formed of water-absorbent paper, and of smaller width than the bag. As will be described, the cover element may then be used to cover a scoop which is used to pick up the dog waste, so that the scoop does not become dirtied and does not therefore need to be cleaned or disposed of after each use.

The generally rectangular cover element may comprise a single sheet of water-absorbent paper having a transverse fold spaced inwardly from one end thereof, which hooks over the end of the scoop. Alternatively the cover element may comprise a further bag which is smaller than the main bag but large enough to fit over the scoop.

A suitable, semi-disposable scoop may be in the form of a flat elongate blank of cardboard or plastics, having weakened fold lines along which the blank may be folded to provide a handle portion at one end thereof and a tray portion at the opposite end thereof. The fold lines may comprise a single fold line which extends longitudinally of the blank from substantially the midpoint of said one end thereof and, part-way along the blank, diverges into two substantially symmetrical fold lines which extend outwardly to the longitudinal side edges of the blank, the part of the blank between said fold lines and said one end of the blank defining said handle portion of the scoop.

DETAILED DESCRIPTION OF THE PREFERRED EMBODIMENT

Figure 1:
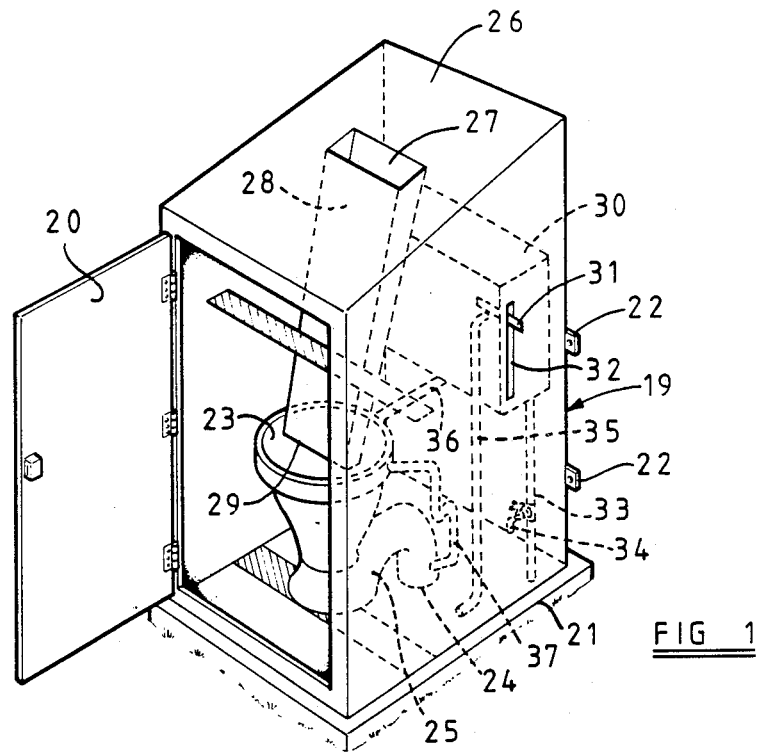
FIG. 1 is a diagrammatic perspective view of a waste disposal unit according to the invention.

Referring to FIG. 1, the disposal unit comprises a generally rectangular metal casing 19 having a lockable front access door 20. The unit may be strongly mounted, for example on a concrete base 21, to prevent vandalism, fixing lugs 22 being provided to secure the back of the unit to a wall.

Alternatively, the unit may be built into a wall, but in this case the wall requires to be formed with a recess, above the unit, to provide access to the top of the unit to permit disposal of dog waste and operation of the unit, as will be described.

Mounted within the casing 19 is an upwardly open bowl 23 from the lower end of which extends an outlet conduit 24 which is curved in conventional manner to provide a U-bend 25 which, when filled with water, will provide a water trap. The outlet conduit 24 is connected to a sewage system (not shown) which may be a main sewer or a septic tank.

The upper surface 26 of the casing slopes upwardly away from the door 20 and is formed with a rectangular slot 27. A rectangular section tubular chute 28 extends downwardly at a steep angle from the slot 27. The open lower end 29 of the chute opens into the bowl 23.

Also mounted within the casing 19 is a conventional water cistern 30 which may be operated by means of a lever 31 which projects through a slot 32 in the side wall of the casing 19. The cistern is supplied with mains water through a conduit 33 and a tap 34 is provided on the conduit 33 within the casing. An overflow pipe 35 leads from the cistern. The outlet pipe 36 from the cistern leads into the upper part of the bowl 23.

In operation, the dog owner simply deposits the dog waste in the slot 27 from where it slides downwardly along the chute 28 into the bowl 23. The waste is then flushed away to the sewage system by operation of the cistern lever 31. Although it is preferable, in order to save water, that it be left to the user to flush the waste away, it is also possible to provide an automatically controlled system which flushes the bowl 23 at regular intervals.

In an alternative arrangement, not shown, the flush cistern 30 may be replaced by a pipe system which directs one or more jets of water into the bowl 23, under pressure, to flush away the waste. In this case operation may be controlled by a valve accessible from outside the casing.

The door 20 provides access to the interior of the casing 19 for the purposes of cleaning or to clear any blockage or other malfunction of the cistern or bowl. The tap 34 provides a convenient source of water, for example for the attachment of a hose, for the purposes of washing down the interior of the casing when required.

An overflow pipe 18, with a U-bend trap, also extends downwardly from the upper part of the bowl 23 to the sewage outlet conduit 24.

Although the parts of the disposal device may be manufactured of any suitable materials, the internal parts are preferably formed from stainless steel. The bowl 23, instead of being generally conical, as shown, may be rectangular in cross-section. The casing 19 may also be formed from stainless steel or any other sufficiently strong material to render it weatherproof and resistant to vandalism.

Figure 2:
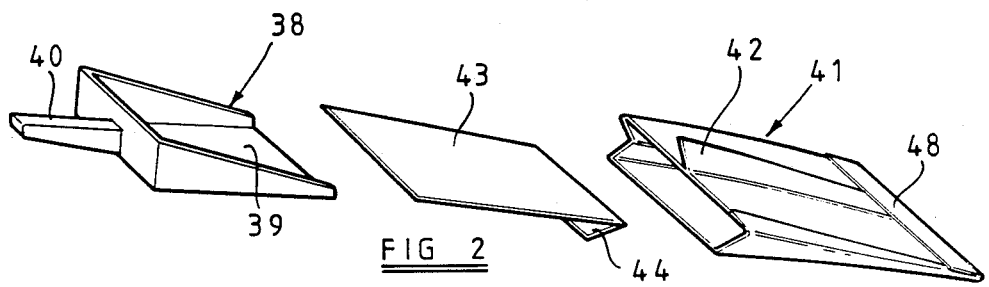
FIG. 2 is a perspective view of a scoop and bag assembly for use with the disposal unit.

FIGS. 2 illustrates a scoop and bag assembly suitable for use in the convenient picking up of dog waste for disposal in the disposal device. The scoop 38 illustrated in FIG. 2 may conveniently be moulded in one piece from plastics material and comprises a tray portion 39 which is open at the front and has connected to it a handle 40. The dog waste is scooped up using the scoop 38 and deposited in a paper bag, such as that indicated at 41, before depositing it in the above-described disposal device.

The paper bag 41 is generally rectangular and is formed from water-absorbent paper, similar to filter paper. The bag is formed from a generally rectangular sheet of paper two opposite side edges of which have been brought together, overlapped and glued together to form a flattened tube, with side gussets, the edge portions of a third side of the sheet being folded over and glued, as indicated at 48, to close the bottom of the bag. The longitudinal overlapping edges are located about mid-way across one of the two faces of the bag, and an extreme outer portion of one of overlapping edges remains unglued to the portion of the opposite side edge which it overlaps, so as to provide a tab or rib 42 which projects from the bag and may conveniently be used as a handle for picking it up.

The purpose of the bag being formed of water-absorbent paper is to facilitate its being flushed away in the disposal unit. The paper of the bag may also be perforated to facilitate its disposal.

The scoop 38 is re-usable. In order to prevent the scoop becoming dirty, there is provided with each bag 41 a cover sheet 43, made of similar paper. The cover sheet 43 is rectangular and of slightly smaller width than the bag 41. It has a folded-over portion 44 at one end. When it is required to pick up dog waste, the cover sheet 43 is first slipped over the top of the tray portion 39 of the scoop 38 and is held in place by the user's thumb, the folded-over part 44 of the sheet being hooked over the end of the tray. The dog waste is picked up on the surface of the cover sheet on the scoop, and the scoop with the waste is then inserted in the bag 41. The scoop is then withdrawn leaving the cover sheet 43 and dog waste inside the bag 41. Since the scoop is protected by the cover sheet it does not become dirtied by the dog waste and does not therefore require cleaning after use.

The bags, cover sheets and scoops may be sold separately to dog owners. Alternatively, supplies of the bags and cover sheets may conveniently be provided in a dispenser, for example a coin-operated dispenser, adjacent the disposal unit. Instead of the plastics scoop 38, a semi-disposable scoop may be packaged with each supply of a number of the bags and cover sheets. For compact packaging the semi-disposable scoop may comprise a flat blank of cardboard or plastics which may be folded into the form of a scoop.

Figures 3, 4:
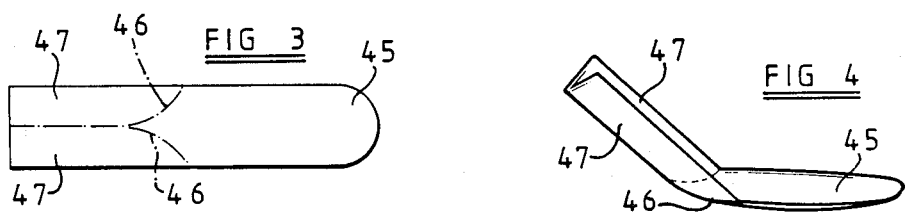
FIG. 3 shows a blank for forming into a semi-disposable scoop for use with the unit.
FIG. 4 is a perspective view of the scoop formed from the blank of FIG. 3.

A suitable form of scoop is shown in FIGS. 3 and 4. FIG. 3 shows the flat cardboard blank which is elongate and has a rounded end 45. The blank is formed with two curved weakened fold lines 46 defining two handle portions 47. To erect the scoop for use, the two handle portions 47 are simply folded up towards one another, along the fold lines 46, as shown in FIG. 4. This imparts a slight concave curve to the rounded end portion 44, giving it more rigidity to act as the tray portion of the scoop.

The scoop is kept erect by pressing the two handle portions 47 together, and is used in the manner described in relation to the scoop 38.

While the use of the cover sheet 43 is preferred, for cheapness, an alternative arrangement may employ a second bag which is fitted over the scoop before the dog waste is picked up. The second bag is preferably smaller in width than the bag 41 so that it may readily be inserted into the bag 41 when fitted to the scoop and carrying the dog waste.

I claim:

1. A disposal unit, for the disposal of dog waste, comprising a casing having an openable access door and a fixed upper wall formed with an inlet aperture which is accessible from outside the casing, a receptacle having an upper opening for receiving waste material and being totally enclosed within the casing and spaced below said upper wall thereof, an outlet conduit leading from the receptacle and out of the casing for connection to a sewage system, a trap in said outlet conduit which, in use, is water-filled to prevent the passage of gases from the sewage system along the outlet conduit and into the receptacle, means for supplying water to the interior of the receptacle above the trap so as to flush waste material from the receptacle, and an elongate inlet conduit having an upper end which is secured to said fixed upper wall of the casing and in register with said inlet aperture, said elongate inlet conduit extending downwardly and having a lower end separate from said upper opening and terminating within the boundaries of said upper opening so as to be in fluidic communication with the receptacle, whereby waste material introduced through said inlet aperture falls under gravity down the inlet conduit and into the receptacle.

2. A disposal unit according to claim 1, wherein the trap is a U-bend in the outlet conduit which, in use, is filled with water.

3. A disposal unit according to claim 1, wherein the receptacle comprises an open-topped bowl, and the lower end of the inlet conduit faces into the open top of the bowl.

4. A disposal unit according to claim 1, wherein the means for supplying water includes a cistern assembly.

5. A disposal unit according to claim 1, wherein the means for supplying water comprises a valve-controlled conduit for connection to a main water supply and opening into the upper part of the receptacle.

6. A disposal unit according to claim 1, wherein the means for supplying water is operable by means of a control member which is accessible externally of the casing.

7. A disposal unit according to claim 1, which includes a water supply conduit within the casing, having a tap whereby water may be withdrawn from the water supply conduit to clean the interior of the casing.

8. A disposal unit according to claim 1, wherein an overflow conduit is connected between the upper part of the receptacle and said outlet conduit.

9. A disposal unit according to claim 8, where said overflow conduit is provided with a trap which, in use, is filled with water.

10. A disposal unit according to claim 1, wherein the openable access door is controlled by a key-operated lock.

11. A disposal unit according to claim 1, wherein said upper wall of the casing is sloped.

* * * * *